No. 625,284. Patented May 16, 1899.
VAN BURTON WILLITS.
VEHICLE WHEEL BRAKE.
(Application filed July 12, 1897.)
(No Model.)
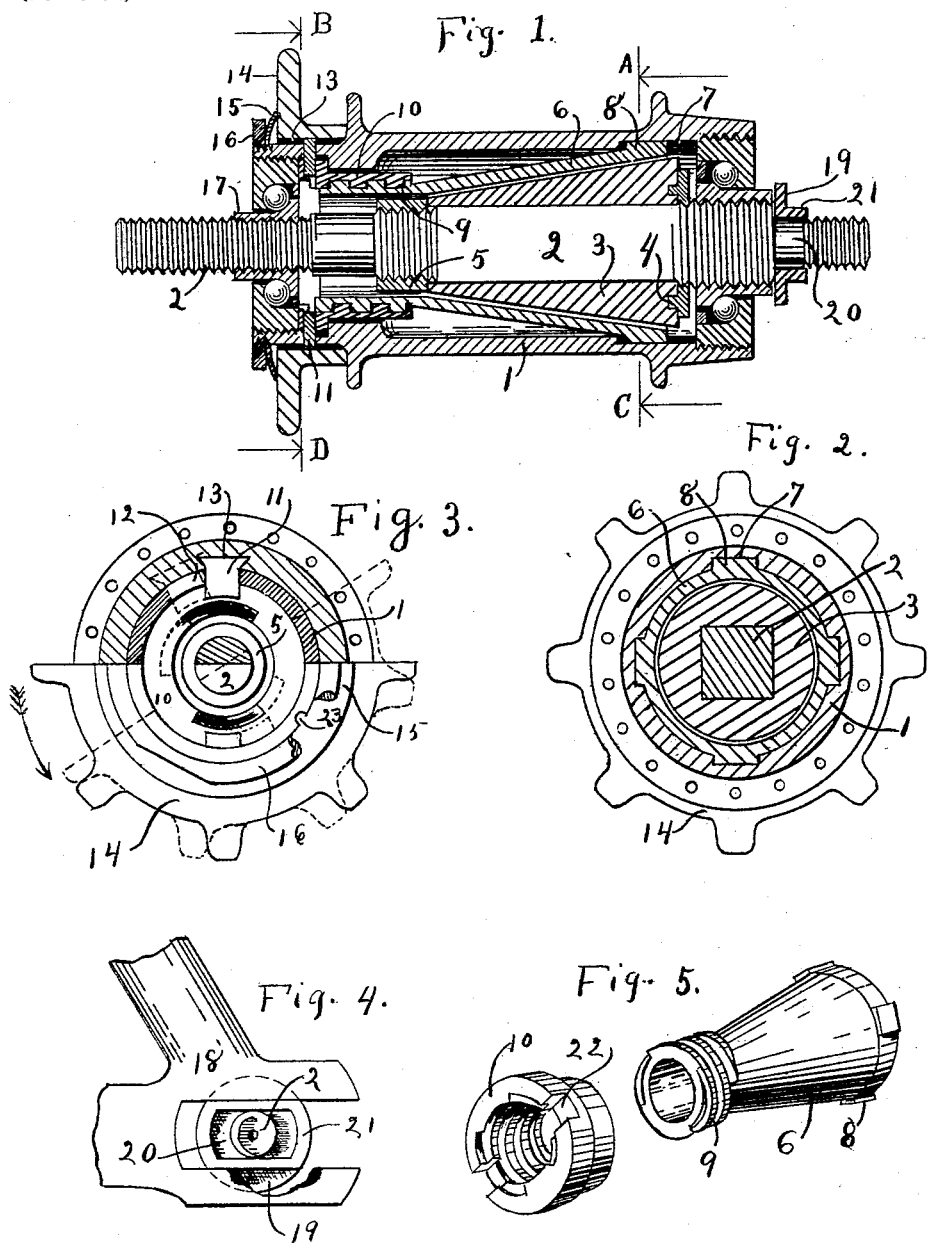
Witnesses
Burgess F. Allen,
Jula Green.
Van Burton Willits, Inventor
By V. H. Lockwood
His Attorney.

United States Patent Office.

VAN BURTON WILLITS, OF INDIANAPOLIS, INDIANA, ASSIGNOR TO THE HAY & WILLITS MANUFACTURING COMPANY, OF SAME PLACE.

VEHICLE-WHEEL BRAKE.

SPECIFICATION forming part of Letters Patent No. 625,284, dated May 16, 1899.

Application filed July 12, 1897. Serial No. 644,352. (No model.)

*To all whom it may concern:*

Be it known that I, VAN BURTON WILLITS, of Indianapolis, county of Marion, and State of Indiana, have invented a certain new and useful Vehicle-Wheel Brake; and I do hereby declare that the following is a full, clear, and exact description thereof, reference being had to the accompanying drawings, in which like numerals refer to like parts.

This invention, which has been patented in Great Britain, being No. 17,578, of July 27, 1897, relates to a brake mechanism located within the hub of a bicycle or other vehicle wheel, where it will be invisible and will not require any material modification of the form or dimensions of either the hub or axle. The bicycle-hubs now in practical use are comparatively large, leaving a space between the hub and the axle which may be utilized for the location of an efficient brake mechanism. With this construction also the parts can be made compact and the connection between the hub and the axle made immediate and direct, whereby the rotation of the hub, and therefore the wheel, may be forcibly or gently retarded and released, as desired. I connect the sprocket-wheel that is used to rotate the hub or wheel with the brake mechanism within the hub, so that the slight reverse movement of the sprocket-wheel will actuate the brake mechanism. This slight reverse movement on a bicycle is effected by slight back-pedaling. The extent to which such brake will retard the movement of the bicycle when it is actuated will be in proportion to the force exerted in the back-pedaling. In other words, the rider can conveniently determine the degree of retardation by the brake mechanism. With this brake mechanism also the parts will remain in the position in which they are placed until changed by the rider, so that in case he actuates the brake mechanism by a back movement or slight stoppage of the pedal the brake will continue to operate until he releases it by a forward movement of the pedal or driving means.

Another feature of my invention is the formation of the brake mechanism by a friction-cone secured to the axle and a conical sleeve slidably mounted in the hub, so that it can be moved into and out of engagement with the friction-cone. By this means great friction-surface is attained, and likewise the cone and sleeve can be very securely mounted in their proper places to resist the strain brought upon them. These features of construction are important because of the limited space for the brake mechanism within the hub. The cone also is adjustably mounted, so that any wear or other change can be compensated for, and it can be put in exactly the proper place for the proper engagement of the sleeve with it.

Another feature of my invention consists of a means for actuating the sliding part or sleeve of the brake mechanism within the hub—namely, a collar having screw-threads in it which engage threads in the sliding part of the brake mechanism, whereby when the collar is rotated one way or the other it will actuate or release the brake.

Other features of invention consist in means whereby such actuating-collar is rotated by the sprocket-wheel and in means for adjusting the degree of tightness of the sprocket-wheel on the hub, whereby it will have no play and will not tend to reverse even when the brake mechanism would permit it unless actuated from the pedals; also, in means for the easy removal of the brake mechanism and axle.

The full nature of my invention will appear from the accompanying drawings and the description and claims following.

In the drawings, Figure 1 is a longitudinal central section of a wheel-hub and the brake mechanism therein. Fig. 2 is a cross-section of the entire device on the line A C of Fig. 1 as seen from the right. Fig. 3 is a cross-section on the line B D of Fig. 1 as seen from the left, parts, however, being not in cross-section and other parts being broken away. Fig. 4 is a detail of the axle in place in the fork of a bicycle-frame. Fig. 5 is a perspective of the actuating-collar and the part of the conical sleeve that enters it.

I show herein the hub 1 of a bicycle-wheel and the axle 2 extending through it. The brake mechanism may be applied to the hub of other vehicle-wheels as well.

3 is a friction-cone, made of hard rubber or any other suitable material, so mounted on the axle as to be stationary therewith. In the form shown I square the axle to receive the friction-cone, which is provided with a square central aperture for such purpose. The friction-cone is so mounted as to be longitudinally adjustable on said axle. The means for effecting such adjustment shown consists in threading the axle at each end of the cone and then placing on the threads the nuts 4 and 5. By turning the nuts one way or the other an adjustment of the cone can be made whereby it will be in the proper place for engagement by the conical sleeve. To engage said friction-cone and thereby retard the movement of the vehicle, I provide a conical sleeve 6, placed within the hub concentric with the cone 3. The sleeve is so mounted within the hub that it will rotate with the hub, but not independent thereof, and yet be longitudinally slidable independent of the hub. This result is accomplished by providing one or more grooves 7 in the interior of the end of the hub that contains the large end of the conical sleeve 6, as seen in Figs. 1 and 2. The large end of said sleeve is also provided with one or more lugs or projecting surfaces 8 to enter the grooves 7 in the hub. The dimensions of the hub and large end of the sleeve should be such that said sleeve can slide longitudinally, but the lugs or projections 8 cannot escape from the grooves 7 in the hub when the parts are subjected to rotary strain.

To move the conical sleeve into and out of engagement with the friction-cone, I provide on the small end of the sleeve a coarse exterior thread 9 and a collar 10 in the hub that receives the small end of the sleeve and has interior threads to engage the thread 9 on the sleeve. Said collar 10 is fitted snugly within the hub, so as to be rotatable therein, but will have no lateral movement bearing axially against an internal flange in the hub and against the inner face of the adjacent ball-cup. Thus the sleeve or sheath is kept centered, so that when it is moved laterally toward the friction-cone all parts of the inner surface of the sleeve will simultaneously and equally engage the surface of the cone. It is to be observed that with this construction—namely, the friction-cone and conical sleeve—I am enabled within the small space between the hub and the axle to secure an effective brake mechanism with a comparatively large bearing-surface and to modify the force of the brake indefinitely.

The collar 10 can be rotated by any desirable means; but for that purpose I have invented the following means: A dog 11 extends through a circumferential slot 12 in the hub, as seen in Fig. 3. A radial recess 22 is made in the collar 10, in which the inner end of the dog fits snugly. The outer end of the dog 11 fits in the groove 13 in the inner surface of the sprocket-wheel 14. The groove 13 is transverse and preferably dovetailed, so that when the dog 11 is in place the sprocket-wheel can be slipped over the end of the hub and the dog. These parts, however, should fit snugly enough to prevent any appreciable looseness or play. The number of dogs 11 may be one or more, two being here shown. The length of the slot 12 should be greater than the width of the dog 11, so that the said dog and the sprocket-wheel and the collar 10 can have a limited rotary movement relatively to the hub, as shown by dotted lines in Fig. 3. The wheel is driven by the sprocket-wheel through the engagement of the dog with the end of the slot, serving as a firm stop.

A forward rotation of the sprocket-wheel 14 through the connection just described will cause the collar 10 to rotate until the dog strikes the stop at the front end of the slot 12, and in doing so will withdraw the conical sleeve 6 from engagement with the friction-cone 3, as seen in Fig. 1. This is the position of the parts when the brake is not in use. By a slight reverse movement of the pedal or drive mechanism, and therefore of the sprocket-wheel, in the direction shown in Fig. 3 by the arrow the sprocket-wheel will move the dog into the position shown in dotted lines in said figure, and through it especially rotate the collar 10, which in turn, abutting against the inner face of the ball-cup, forces the sleeve 6 into engagement with the cone 3.

By reason of the screw-thread connection between the collar 10 and the sleeve 3 the parts will retain the position in which they may be at any time placed. By binding the sprocket-wheel so that it will not readily turn on the hub it also contributes to this result. It is obvious that the greater the force applied in reversing or moving backward the sprocket-wheel the greater will be the effectiveness of the brake.

To bind the sprocket-wheel so that it will be held steady and will not turn on the hub without the application of some outside power and also to keep dust out of the mechanism within the hub that might enter through the grooves 13 in the interior of the sprocket-wheel, I provide a dish-shaped spring-washer 15, that surrounds the hub and bears with its outer edge against the sprocket-wheel, as seen in Fig. 1. It has a lug 23, fitting into a corresponding groove in the hub, as seen in Fig. 3, to prevent the rotation of the washer with the sprocket-wheel when the latter turns partially on the hub, as will presently appear. The washer is held in place and tightened by the ring-nut 16, that screws over the exterior threads on the end of the hub. By moving this nut 16 the pressure of the spring-washer against the sprocket-wheel may be increased or diminished, so as to give said sprocket-wheel any degree of ease of movement.

At each end of the hub I provide a ball-bearing for the axle of any ordinary construction. I make the exterior diameter of the bearing-cone 17 less than the interior diameter of the small end of the sleeve 6. This allows the removal of the shaft and friction-cone by merely removing the cup at the end of the hub containing the large end of the sleeve 6 and without removing the bearing at the other end.

In view of the torsional strain brought upon the axle by this brake I enlarge the bearing thereof in the fork 18 of the bicycle-frame by placing the peculiarly-formed washer 19 over the flattened portion 20 of the shaft, having an opening which matches more closely to the flat shaft than it is possible for the fork of the frame to match. Said washer is recessed or notched on two opposite sides, as seen in Fig. 1, so as to form a wider bearing surface or extension 21, over which the less perfectly fitted fork of the bicycle is secured, as seen in Fig. 4. This strengthens the attachment of the axle to the bicycle-frame, whereby it can better resist the torsional strain.

Attention is called to the fact that by using the friction-cone and sleeve, as set forth, I get my brake inside the hub, have a brake of great power, yet which can be sensitively graduated and controlled, as desired, and there is no appreciable end thrust of the parts, the strain being torsional, and neither the bicycle-wheel nor the bicycle-frame is shifted in the operation of the brake.

What I claim as my invention, and desire to secure by Letters Patent, is—

1. The combination of the hub of a bicycle or other vehicle wheel, said hub having an interior longitudinal recess or groove, an axle, a friction-cone secured to the axle within the hub, a conical sleeve mounted within the hub concentric with the cone and having a lug on its large end that can slide in the recess or groove in the hub and which will cause the sleeve to rotate with the hub, and means for sliding the sleeve laterally into and out of engagement with the friction-cone.

2. The combination of the slotted hub of a bicycle or other vehicle wheel, an axle, a brake member so mounted on the axle within the hub that it will not rotate, another brake member mounted within the hub so that it will rotate therewith, one of said brake members being held from lateral movement and the other capable of lateral movement and threaded, a threaded collar mounted within the hub for moving the threaded brake member laterally into and out of engagement with the stationary member, a sprocket-wheel so mounted on the hub as to have a limited rotary movement independent thereof, and means for connecting the threaded collar and sprocket-wheel for rotating the threaded collar.

3. The combination of the hub of a bicycle or other vehicle wheel, an axle, a friction-cone secured on the axle within the hub, a conical sleeve mounted within the hub so as to rotate therewith and be laterally movable and concentric with the friction-cone and threaded at one end, a collar mounted within the hub so as to rotate but have no lateral movement and with threads that engage the threads of the conical sleeve, and means for rotating such threaded collar.

4. The combination of the hub of a bicycle or other vehicle wheel with a circumferential slot in it, a sprocket-wheel loosely mounted on the hub with an interior recess or groove, an axle, a brake member comprising a friction-cone so mounted on the axle within the hub that it will not rotate, another brake member comprising a friction-sleeve mounted in the hub so that it will rotate and be concentric with the friction-cone, one of said brake members being held from lateral movement and the other brake member being laterally movable, threaded at one end, a collar mounted within the hub so as to rotate and having no lateral movement and provided with threads that engage the threads in the brake member, and a dog fitting in the groove in the sprocket-wheel and extending through the slot in the hub and at its inner end engaging with said threaded collar whereby such collar will be rotated by the sprocket-wheel.

5. The combination of the hub of a bicycle or other vehicle wheel with a circumferential slot in it, a sprocket-wheel loosely mounted on the hub over the slot and having an interior recess or groove, an axle, a friction-cone secured on the axle within the hub, a conical sleeve slidably mounted in the hub with exterior threads on the smaller end, a collar so mounted within the hub as to rotate but having no lateral movement and having interior threads to engage the threads on the sleeve and having a recess in it, and a dog that fits in the recess of the sprocket-wheel and threaded collar and extends through the slot in the hub, said slot in the hub being large enough to permit a limited movement of the sprocket-wheel within the hub.

6. The combination of the hub of a bicycle or other vehicle wheel, an axle therein, a friction-cone secured on the axle, a conical sleeve slidably mounted within the hub concentric with the friction-cone, means for sliding said sleeve, and a ball-bearing for the axle at each end of the hub, the bearing-cone adjacent to the small end of the conical sleeve having an exterior diameter less than the interior diameter of the small end of said sleeve.

In witness whereof I have hereunto set my hand this 3d day of July, 1897.

VAN BURTON WILLITS.

Witnesses:
  V. H. LOCKWOOD,
  ZULA GREEN.